Dec. 4, 1923.
A. A. HOLLE
1,476,447
MOTOR ROAD VEHICLE
Filed Dec. 30, 1922   3 Sheets-Sheet 1
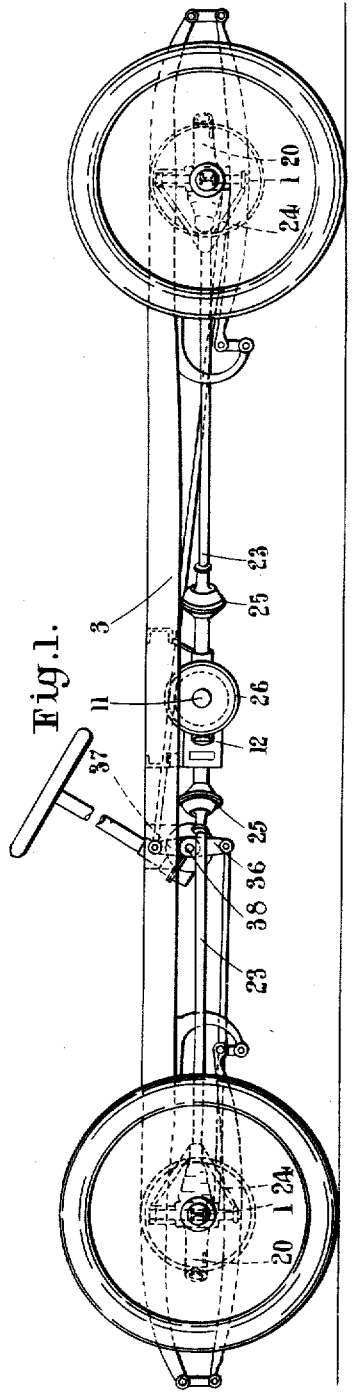
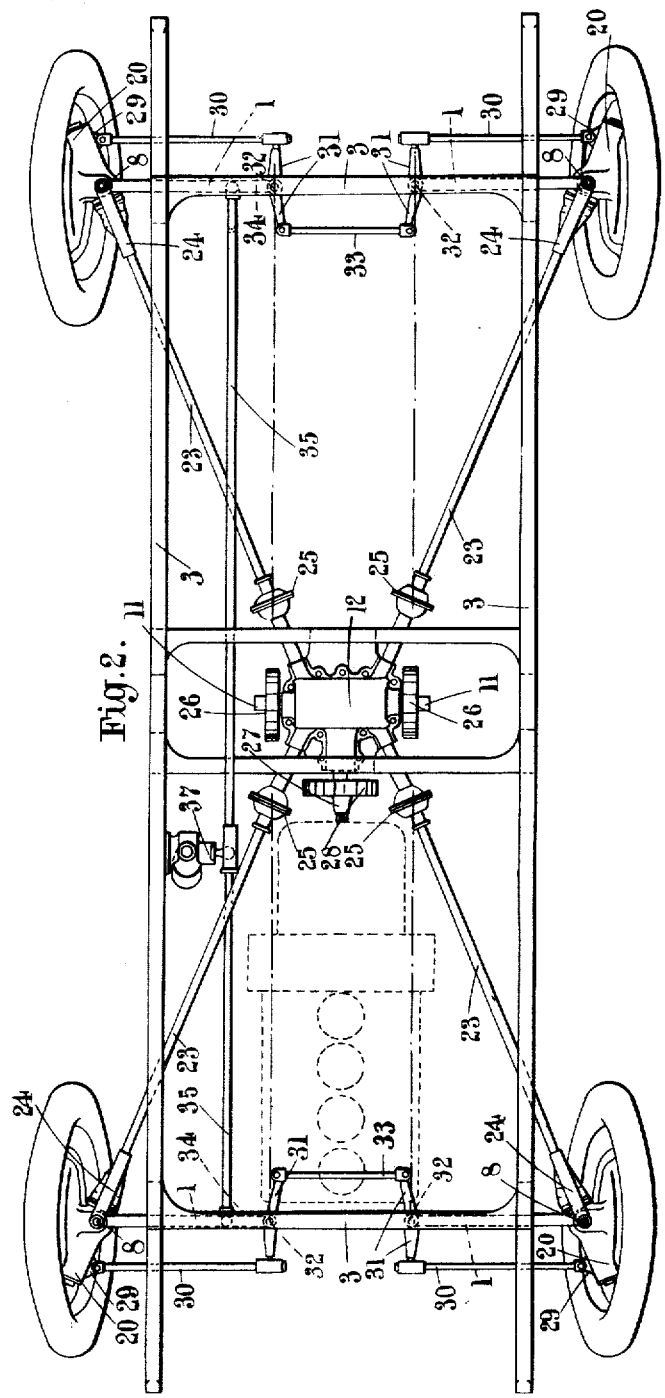
INVENTOR
Alexander Albert Holle
per Robert E. Phillips
Attorney

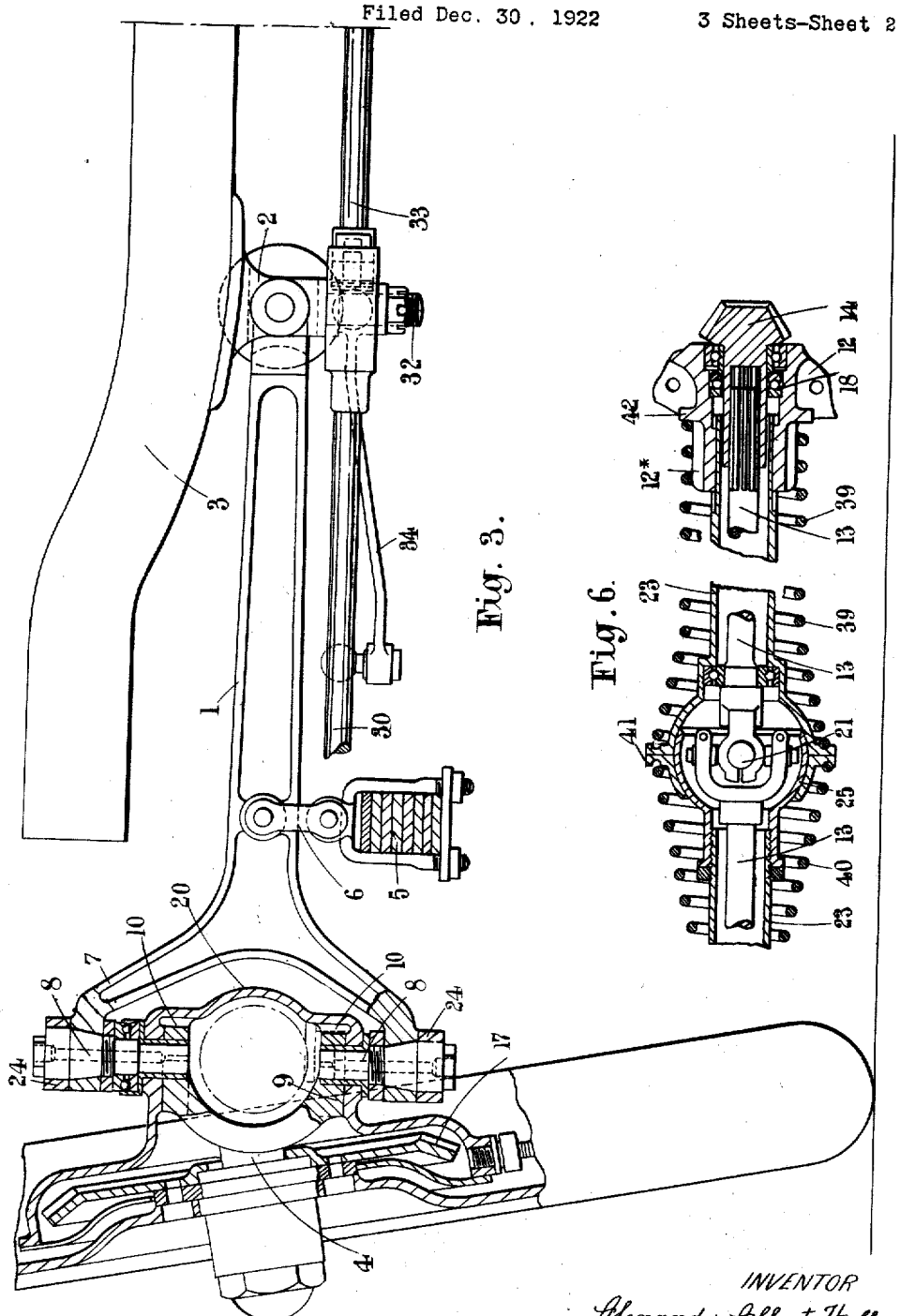

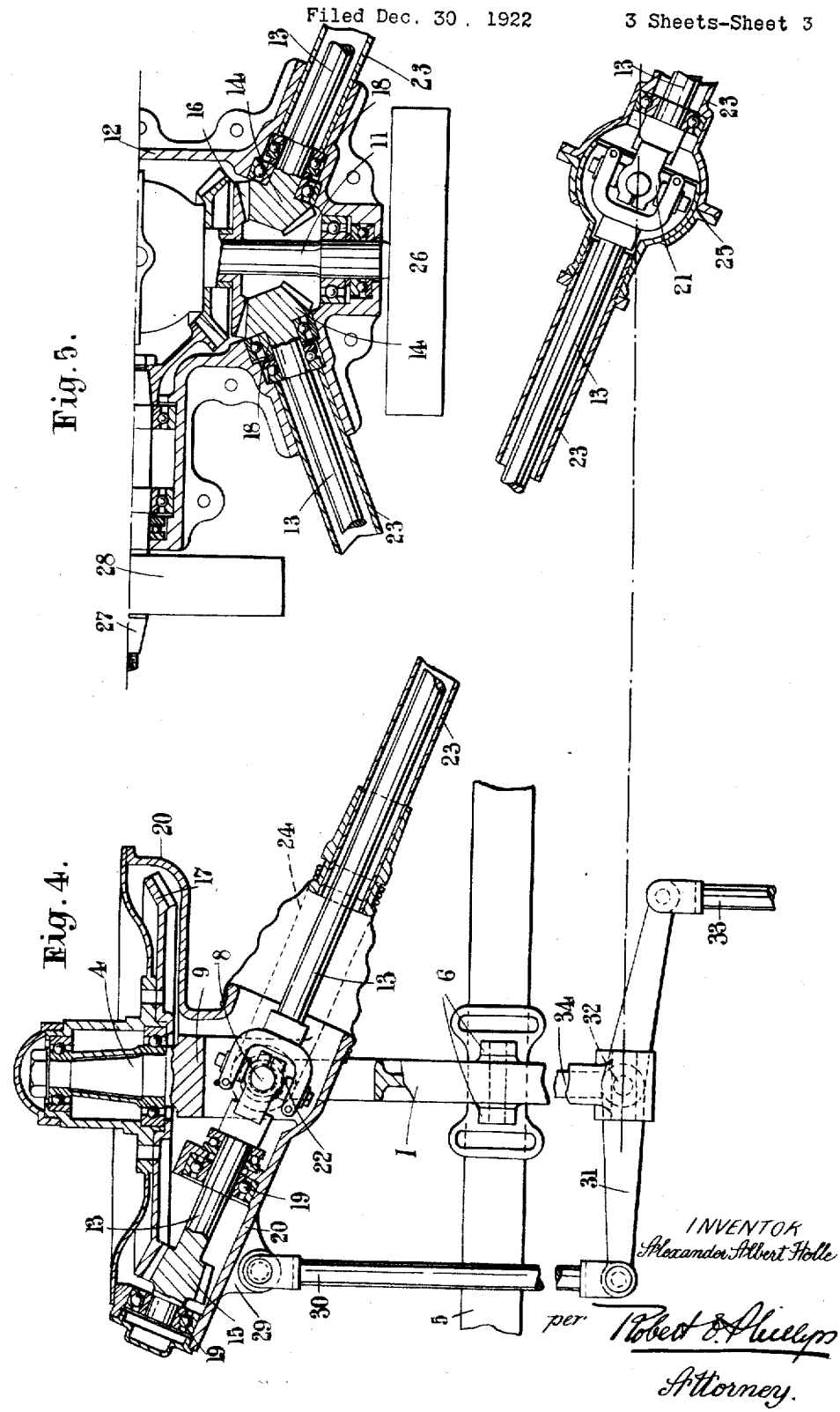

Patented Dec. 4, 1923.

1,476,447

UNITED STATES PATENT OFFICE.

ALEXANDER ALBERT HOLLE, OF PADDINGTON, LONDON, ENGLAND.

MOTOR ROAD VEHICLE.

Application filed December 30, 1922. Serial No. 609,867.

*To all whom it may concern:*

Be it known that I, ALEXANDER ALBERT HOLLE, a subject of the Queen of the Netherlands, residing at 60 Oxford Terrace, Paddington, in the county of London, England, have invented a new and useful Improvement in Motor Road Vehicles, of which the following is a full and complete specification.

This invention relates to motor road vehicles and has for its object to improve their road holding qualities and incidentally also their driving. steering and springing qualities by reducing the unsprung weight set in motion when any one of the road wheels meets with an inequality in the road surface, by causing the front and rear wheels to track at all times whereby the tendency to skid or side-slip is avoided, by ensuring under all conditions a constant degree of castor action of all the road wheels by rendering the steering independent of all motion set up by the inequalities of the road surface, by relieving the springs of all functions other than supporting the load, and by eliminating the unstable directional couple which arises in vehicles driven by the rear wheels only. A further object of this invention is a construction of undercarriage and running gear which is specially adapted for mass production and service maintenance by reason of the reduction of the number of different component parts which in production affords greater facility in assembling and in service maintenance affords greater facility in the replacement of parts. Other objects and advantages will appear in the subjoined detailed description.

In the accompanying drawing which illustrates this invention:—

Figs. 1 and 2 are views in side elevation and plan of the complete lay out.

Fig. 3 is a half view in front elevation partly in section and on an enlarged scale showing one of the axles carrying the road wheels.

Fig. 4 is a broken view in plan partly in section and on an enlarged scale showing the driving connection between one of the secondary driving shafts and one of the road wheels.

Fig. 5 is a broken half view in plan partly in section and on an enlarged scale showing the driving connection between the main driving shaft and one of the secondary driving shafts.

Fig. 6 is a broken view—partly in section—showing a modification of a part of the transmission gearing.

Throughout the views similar parts are marked with like numerals of reference.

Both the fore and aft pair of road wheels are each carried by a divided non-rotating axle the two parts 1 and 1 of which hereinafter called the "half axles" are pivoted at their inner ends to brackets 2 mounted on the frame 3 of the undercarriage, and said half axles are articulated near their outer ends by means of vertically arranged pivotal joints the outer ends 4 of said axles being shaped and arranged to form stub axles for carrying the road wheels. The half axles 1 are connected to the adjacent suspension springs 5—which may be of the type shown or any other suitable type—by means of links 6 which will permit of the vertical oscillation of said axles relative to the frame of the undercarriage. A convenient form of pivotal joint comprises a fork 7 carried by the inner part of the half axle, two vertically arranged pins 8 and 8 mounted in said fork in axial alignment with one another, a hollow block 9 carrying the outer part 4 of the half axle 1 and having aligned sockets 10 and 10 in which the pins 8 and 8 fit.

Centrally arranged in relation to the two pairs of road wheels is a transverse shaft 11 which is carried in suitable bearings in a case 12 mounted in the frame 3. This transverse shaft 11 is driven by bevel or other suitable gearing from the main driving shaft 27 which receives its motion through a change speed gearing of the usual type from the power unit of the vehicle. When a differential gear is employed the shaft 11 is a divided or two-part one, and said gear is interposed—in the well-known manner—between the driving shaft 27 and the two parts of the shaft 11. This transverse shaft is in driving connection with the road wheels by means of four diagonally arranged shafts 13 hereinafter for distinction designated "propeller" shafts. These propeller shafts each carry two bevel pinions 14 and 15, which gear respectively with a bevel wheel 16 on the driving shaft 11 and a bevel wheel 17 on one of the road wheels, and are each mounted in suitable bearings 18 and 19 the former carried by the case 12 and the latter carried by a case 20 which is mounted on the block 9 of the end 4 of the half axles 1 and is adapted to enclose the bevel gearing. The propeller shafts are each formed in three parts which are coupled together by two universal joints 21 and 22 the former being located at such a point as will bring it into alignment with the pivot of the half axle on the same side of the undercarriage and the latter in alignment with the axis of the vertical pivotal joint of the half axle.

Coacting with the propeller shafts are torque members which conveniently take the form of tubes 23 which extend between the case 12 of the shaft 11 and the pivotal joints of the half axles 1 the connections to said joints being by means of forks 24 which engage the pins 8 of said joints. In each of said torque tubes 23 is a universal joint 25 which is in axial alignment with the universal joint 21 in the propeller shaft enclosed by said tube.

It will be seen that the transmission gear comprises a centrally located transverse shaft carried by the undercarriage and four V-shaped components all of which are alike and each of which consists essentially of a transverse non-rotating axle and an angularly arranged driving shaft located in a torque member the outer end of said axle being adapted to carry one of the road wheels, and each of said driving shafts being adapted to drive one of the road wheels.

On the transverse shaft 11 are mounted two brake drums 26 and on the main driving shaft 27 is another brake drum 28 with all of which co-operate braking mechanisms of the usual type.

Each of the articulated ends 4 of the half axles 1 is, through the medium of an offset lug 29 on the casing 20 and a link 30, connected with one end of a lever 31 which is pivoted at the centre of its length to one of the brackets 2 on the frame 3 by means of a vertically arranged pin 32 which is in axial alignment with the centre of the joint by which the half axle is pivoted to said frame, the other ends of each pair of said levers 31 at either end of the undercarriage being coupled by means of a link 33. Secured to the levers 31, at the opposite ends of the undercarriage and on one side thereof, are arms 34 which are connected by means of links 35 with a pair of opposed arms 36 and 37 mounted on the shaft 38 of the hand controlling mechanism of the steering gear which is of the well-known type.

In order to absorb the horizontal fore and aft component of the force resulting from shock from the road wheels meeting inequalities in the road surface and incidentally to impart the drive through a spring cushion or buffer both the propeller shafts 13 and the torque members 23 may each be arranged to telescope as shown in Fig. 6 the former by having the bevel pinion 14 splined on to it and the latter by being splined into a boss 12* on the case 12 adapted to carry said torque member said boss being concentrically arranged in relation to the bearing 18. Suitable springs 39 and 40 are mounted to operate between a flange 41 on the torque member and suitable fixed abutments carried by the frame 3 one of which may conveniently be a flange 42 on the boss 12* of the case 12, and the other—not shown in the drawings—may be an annular flange carried by any suitable part of the frame 3, or of a component mounted thereon.

It is understood that this invention is not limited in its broader phases to the exact details of construction shown in the accompanying drawings and hereinbefore described, but that it also includes such changes and modifications as lie within the spirit and scope of the appended claims.

What I claim is:—

1. A motor road vehicle of the type in which all four wheels are driven and employed for steering purposes, comprising a transverse shaft driven by the power unit and mounted in bearings carried by a case carried by the frame of the undercarriage, four articulated axles each carrying one of the road wheels each pivoted to the frame of the undercarriage at its inner end and each connected to one of the springs of said undercarriage between its pivoted inner end and its point of articulation, four propeller shafts running between the transverse driving shaft and the road wheels, gearing between the ends of said propeller shafts and said transverse driving shaft on the one hand and the road wheels on the other hand, universal joints in said propeller shafts and four torque members coacting with said propeller shafts and each having a universal joint in alignment with one of the universal joints in one of said propeller shafts.

2. A motor road vehicle of the type in which all four wheels are driven and employed for steering purposes, comprising a transverse driving shaft driven by the power unit and mounted in bearings carried by a case carried by the frame of the undercarriage, four articulated axles each carrying one of the road wheels each pivoted to the frame of the undercarriage at its inner end and each connected to one of the springs of said undercarriage between its pivoted inner end and its point of articulation, four propeller shafts running between the transverse driving shaft and the road wheels, gearing between said propeller shafts and said transverse driving shaft and road wheels respectively, two universal joints in each of said propeller shafts one in alignment with the axis of the vertical pivots of one of the articulated axles and the other adjacent to the transverse driving shaft, four torque members each of which coacts with one of the propeller shafts and having a universal joint in alignment with the universal joint in said propeller shaft adjacent to the transverse driving shaft, coupling mechanism between each pair of road wheels, comprising two horizontally disposed levers pivoted to the frame of the undercarriage, rods coupling each of said levers with one of the road wheels, a rod coupling said levers, arms carried by said levers, and coupling rods connecting said arms with arms mounted on the rocking shaft of the hand controlling mechanism of the steering gear.

3. A motor road vehicle of the type in which all four wheels are driven and employed for steering purposes, comprising a transverse shaft driven by the power unit and mounted in bearings in a case carried by the frame of the undercarriage of the vehicle, four axles pivoted to the frame of the undercarriage at their inner ends which are connected to the springs of said undercarriage and which carry at their outer ends vertically arranged pivots, stub axles for carrying the road wheels carried by said pivots, four propeller shafts running between the transverse driving shaft and the road wheels, gearing between the ends of the propeller shafts and the transverse driving shaft and road wheels respectively, two universal joints in each of said propeller shafts one in alignment with the axis of the pivot of one of the stub axles carrying a road wheel and the other adjacent to the case in which the transverse driving shaft is mounted, four torque members, each coacting with one of the propeller shafts and having a universal joint in alignment with the universal joint in said propeller shaft adjacent to the case of the transverse driving shaft, brake drums mounted on the transverse driving shaft, coupling mechanism between each pair of road wheels, comprising two horizontally disposed levers pivoted to the frame of the undercarriage, rods coupling each of said levers with one of the road wheels, a rod coupling said levers, arms carried by said levers, and coupling rods connecting said arms with arms mounted on the rocking shaft of the hand controlling mechanism of the steering gear.

4. A motor road vehicle of the type in which all four wheels are driven and employed for steering purposes, comprising a transverse shaft adapted to be driven from the power unit said shaft being mounted in bearings carried by a case mounted in the frame of the undercarriage of the vehicle centrally in relation to the road wheels, four axles pivoted at their inner ends to the frame of the undercarriage which are connected to the springs of said undercarriage and which carry at their outer ends vertically arranged pivots, stub axles carried by said pivots and adapted to carry the road wheels, four diagonally arranged shafts running between the case of the central driving shaft and the pivots of the stub axles carrying the road wheels, gearing between the ends of said propeller shafts and the central shaft and road wheels respectively, two universal joints in each of said propeller shafts one in alignment with the axis of the pivot of the stub axle and the other adjacent to the case of the transverse driving shaft, a torque tube encircling and enclosing each of the propeller shafts and extending between the case of the transverse driving shaft and one of the vertical pivots carried by one of the axles carrying one of the road wheels, said tube having a universal joint in alignment with the universal joint in the propeller shaft adjacent to the case of the transverse driving shaft, brake drums mounted on the transverse driving shaft, a pair of horizontally disposed levers pivoted at each end of the frame of the undercarriage, rods coupling each pair of said levers with the stub axles of each pair of road wheels, rods coupling the levers of each pair to one other, arms carried by two of said levers one at each end of the frame and on the same side thereof, and coupling rods connecting said arms with arms mounted on the rocking shaft of the hand controlling mechanism of the steering gear.

5. A motor road vehicle of the type in which all four wheels are driven and employed for steering purposes, comprising a transverse shaft adapted to be driven from the power unit said shaft being mounted in bearings carried by a case mounted in the frame of the undercarriage of the vehicle centrally in relation to the road wheels, four axles pivoted at their inner ends to said frame and connected to the springs of the undercarriage, vertically arranged pivots carried by the outer ends of said axles, stub axles for the road wheels carried by said pivots, four telescopic propeller shafts running between the transverse driving shaft and the road wheels, gearing between the ends of said propeller shafts and the transverse driving shaft and the road wheels respectively, two universal joints in each of said propeller shafts one in alignment with the axis of the pivot of the road wheel and the other adjacent to the case of the transverse driving shaft, a telescopic torque tube encircling and enclosing each of the propeller shafts and extending between the case of the transverse driving shaft and one of the vertical pivots carried by one of the axles carrying the road wheels, said tube having a universal joint in alignment with the universal joint in the propeller shaft adjacent to the case of the transverse driving shaft, a pair of horizontally disposed levers pivoted at each end of the frame of the undercarriage, rods coupling each pair of said levers with the stub axles of each pair of road wheels, rods coupling the levers of each pair to one another, arms carried by two of said levers one at each end of the frame and on the same side thereof, and coupling rods connecting said arms with the hand controlling mechanism of the steering gear.

6. In a motor road vehicle the combination of two divided non-rotating axles for carrying the front and rear road wheels the two parts of each divided axle being hinged to the frame of the undercarriage adjacent to its longitudinal centre line and connected respectively to the front and rear springs of the undercarriage by suitable links, and each of said half axles being articulated by a vertical pivot to form a swinging part adapted to carry one of the road wheels; a differential gear centrally located in the frame of the undercarriage; four propeller shafts connecting the two driven elements of the differential gear with said road wheels, each of said propeller shafts being formed in three parts, the end parts being mounted in bearings carried respectively by the casing of the differential gear and a casing carried by the articulated end of one of the half axles, and the middle part being connected to said end parts by means of universal joints, the joint connecting the end part adjacent to a road wheel being in alignment with the axis of the vertical pivot of the half axle carrying said road wheel; and four torque members extending between the casing of the differential gear and the vertical pivots of the half axles and each having a universal joint coaxial with the universal joint of the propeller shaft adjacent to the differential gear.

7. In a motor road vehicle the combination of two divided non-rotating axles for carrying the front and rear road wheels, the two parts of each divided axle being hinged to the frame of the undercarriage adjacent to its longitudinal centre line and connected respectively to the front and rear springs of the undercarriage by suitable links and each of said half axles being articulated by a vertical pivot to form a swinging part adapted to carry one of the road wheels: coupling mechanism between the two road wheels of each pair at the front and rear of the undercarriage respectively comprising two levers pivoted to the frame of the undercarriage, links coupling said levers to the swinging part of the non-rotating axles, a link coupling said two levers together, arms carried by one of said levers at each end of the undercarriage on one side thereof, and rods connecting said coupling mechanism with the mechanism of the hand control of the streeing gear; a differential gear centrally located in the frame of the undercarriage; four propeller shafts connecting the two driven elements of the differential gear with said road wheels, two of said propeller shafts being in gear with each of said driven elements of the differential gear and each of said propeller shafts being formed in three parts the end parts being mounted in bearings carried respectively by the casing of the differential gear and a casing carried by the articulated end of one of the half axles, and the middle part being connected to said end parts by means of universal joints, the joint connecting the end part adjacent to a road wheel being in alignment with the axis of the vertical pivot of the half axle carrying said road wheel; and four torque members extending between the casing of the differential gear and the vertical pivots of the half axles and each having a universal joint coaxial with the universal joint of the propeller shaft adjacent to the differential gear.

8. In a motor road vehicle the combination of two divided non-rotating axles for carrying the front and rear road wheels, the two parts of each divided axle being hinged to the frame of the undercarriage adjacent to its longitudinal centre line and connected respectively to the front and rear springs of the undercarriage by suitable links and each of said half axles being articulated by a vertical pivot to form a swinging part adapted to carry one of the road wheels; a differential gear centrally located relative to the four road wheels; four telescopic propeller shafts connecting the two driven elements of the differential gear with said road wheels, each of said shafts being formed in three parts the end parts being mounted in bearings carried respectively by the casing of the differential gear and a casing carried by the articulated end of one of the half axles, and the middle part being connected to said end parts by means of universal joints, the joint connecting the end part adjacent to a road wheel being in alignment with the axis of the vertical pivot of the half axle carrying said road wheel; four telescopic torque members extending between the casing of the differential gear and the vertical pivots of the half axles and each having a universal joint coaxial with the universal joint of the driving shaft adjacent to the differential gear; and springs acting axially between each of said torque members and fixed abutments carried by the frame.

9. In a motor road vehicle the combination of two divided non-rotating axles for carrying the front and rear road wheels, the two parts of each divided axle being hinged to the frame of the undercarriage adjacent to its longitudinal centre line and connected respectively to the front and rear springs of the undercarriage by suitable links and each of said half axles being articulated by a vertical pivot to form a swinging part adapted to carry one of the road wheels; coupling mechanism between the two road wheels of each pair at the front and rear of the undercarriage respectively comprising two levers pivoted to the frame of the undercarriage, links coupling said levers to the swinging parts of the divided non-rotating axles, a link coupling said two levers together arms carried by one of said levers at each end of the undercarriage on one side thereof, and rods connecting said coupling mechanism with the hand control of the steering mechanism; a differential gear centrally located in the frame of the undercarriage; four diagonally arranged telescopic propeller shafts connecting the two driven elements of the differential gear with said road wheels, two of said shafts being in gear with each of said driven elements of the differential gear and each of said shafts being formed in three parts, the end parts being mounted in bearings carried respectively by the casing of the differential gear and a casing carried by the articulated part of one of the non-rotating axles, and the middle part being connected to said end parts by means of universal joints, the joint connecting the end part adjacent to a road wheel being in alignment with the axis of the vertical pivot of the non-rotating axle carrying said road wheel; four telescopic torque members extending between the casing of the differential gear and the vertical pivots of the non-rotating axles and each having a universal joint coaxial with the universal joint of the driving shaft adjacent to the differential gear; and two balanced springs acting axially between each of said torque members and fixed abutments carried by the frame of the undercarriage.

10. In an undercarriage for motor road vehicles the combination with the frame of suspension springs carried by said frame, two divided non-rotating axles for carrying the front and rear road wheels, the two parts of each said axle being hinged respectively to the front and rear part of said frame adjacent to its longitudinal centre line, and connected to the adjacent suspension springs by suitable links, each of said half axles being articulated by a vertical pivot to form a swinging part adapted to carry one of the road wheels; a differential gear centrally located in the frame of the undercarriage in relation to the four road wheels, four diagonally arranged propeller shafts connecting the two driven elements of said differential gear with the road wheels, two of said propeller shafts being in gear with each of said driven elements of the differential gear and each of said propeller shafts being formed in three parts the end parts being mounted in bearings carried respectively by the casing of the differential gear and the articulated part of one of the non-rotating axles, and the middle part being connected to said end parts by means of universal joints one of which connecting the end part of each shaft adjacent to a road wheel being in alignment with the axis of the vertical pivot, of the articulated end of said non-rotating shaft; four torque tubes enclosing the propeller shafts and extending between the casing of the differential gear and the ends of the non-rotating axles adjacent to their vertical pivots, and each having a universal joint coaxial with the universal joint of the driving shaft adjacent to the differential gear; brake drums mounted on the driving and driven elements of the differential gear; and coupling mechanism between each pair of road wheels comprising two levers pivoted to the frame of the undercarriage by longitudinally arranged pivots, links coupling said levers to the swinging parts of the non-rotating axles, a link coupling said two levers together, arms carried by one of said levers at each end of the undercarriage on the same side thereof and rods connecting said coupling mechanism with the controlling mechanism of the steering gear.

11. A driving gear for motor road vehicles comprising in combination with a centrally arranged transverse driving shaft mounted in bearings carried by the frame of the undercarriage, four identical components each consisting of an axle transversely arranged in relation to the frame of the undercarriage and connected to one of the springs of said undercarriage said axle being pivoted at its inner end to said frame, a stub axle adapted to carry one of the road wheels pivoted to the half axle by a vertically disposed pivotal joint, a torque member extending between the frame of the undercarriage adjacent to the central driving shaft and the outer end of the half axle, said torque member being provided with a single universal joint, and a propeller shaft coacting with said torque member and coupling the central driving shaft with one of the road wheels through suitable gearing; said propeller shaft being provided with two universal joints one in alignment with the axis of the pivotal joint by which the stub axle is pivoted to its half axle and the other in alignment with the universal joint in the torque member.

12. A driving gear for motor road vehicles comprising in combination with a centrally arranged transverse shaft mounted in bearings carried by the frame of the undercarriage, four identical components each consisting of an axle transversely arranged in relation to the frame of the undercarriage and connected to one of the springs of said undercarriage by links said axle being pivoted at its inner end to said frame by a horizontally and longitudinally disposed pivot so that it can oscillate in a vertical direction only, a stub axle adapted to carry one of the road wheels pivoted to the half axle by a vertically disposed pivotal joint, a propeller shaft operating through gearing between the central driving shaft and one of the road wheels said propeller shaft being provided with two universal joints and a torque member co-operating with each of said propeller shafts and extending between the frame of the undercarriage adjacent to the central driving shaft and the outer end of the half axle.

13. A driving gear for motor road vehicles comprising in combination with a common differential gear mounted in the frame of the vehicle centrally in relation to the four road wheels, four identical components each consisting of an axle transversely arranged in relation to the frame of the undercarriage and connected to one of the springs of said undercarriage said axle being pivoted at its inner end to said frame, a stub axle adapted to carry one of the road wheels pivoted to the half axle by a vertically disposed pivotal joint, a telescopic torque member extending between the case of the differential gear and the outer end of the half axle said torque member being provided with a universal joint, a telescopic propeller shaft operating through bevel gearing between one of the driven elements of the differential gear and one of the road wheels, said shaft being provided with two universal joints one in alignment with the axis of the pivotal joint by which the stub axle is pivoted to the half axle and the other in alignment with the universal joint in the torque member, and a pair of balanced springs operating axially between said torque member and two fixed abutments carried by the frame of the undercarriage.

14. For motor road vehicles a transmission gear comprising a differential gear, four identical components each consisting of an articulated axle transversely arranged in relation to the frame of the undercarriage and connected to one of the springs of said undercarriage said axle being adapted to carry one of the road wheels, a torque tube extending between the case of the differential gear and said axle said tube being pivoted to said axle at its point of articulation and being provided with a universal joint, and a propeller shaft located in said torque tube and operating between one of the driven elements of the differential gear and one of the road wheels said shaft being provided with two universal joints one in alignment with the axis of the articulation of the half axle and the other in alignment with the universal joint in the torque tube.

15. In a transmission gear for motor road vehicles the combination with a differential gear, of four identical components each consisting of a half axle transversely arranged in relation to and pivoted by a longitudinally arranged pivot to the frame of the undercarriage, a link coupling said half axle to one of the suspension springs, a stub axle adapted to carry one of the road wheels pivoted to the half axle by a vertically disposed pivotal joint, a torque member which extends between the case of the differential gear and the outer end of the half axle and pivoted to said half axle by the same pivot as the stub axle is hinged to said half axle said torque member being provided with a universal joint which is so located that its axis is intersected by the longitudinal axis of the pivot by which the inner end of the half axle is pivoted to the frame of the undercarriage, and a propeller shaft operating through toothed gearing between one of the driven elements of the differential gear and one of the road wheels said shaft being provided with two universal joints, one in alignment with the axis of the pivotal joint by which the stub axle is pivoted to the half axle and the other in alignment with the universal joint in the torque member.

16. In a transmission gear for motor road vehicles the combination with a differential gear, of four identical components each consisting of a half axle transversely arranged in relation, and pivoted by a longitudinally arranged pivot to the frame of the undercarriage; a link coupling said half axle to one of the suspension springs; a stub axle adapted to carry one of the road wheels pivoted to the half axle by a vertically disposed pivotal joint; a telescopic propeller shaft operating between one of the driven elements of the differential gear and one of the road wheels through suitable gearing; a telescopic torque member coacting with said propeller shaft said torque members extending between the case of the differential gear and the outer end of the half axle and being spring loaded axially in opposite directions both said propeller shaft and said torque members being provided with universal joints the latter having one located in proximity to the case of the differential gear and the former having two universal joints, one in alignment with the axis of the pivotal joint by which the stub axle is pivoted to the half axle and the other in alignment with the universal joint in the torque member.

ALEXANDER ALBERT HOLLE.